Aug. 19, 1969 H. B. WEBER ET AL 3,461,814

DAMPENED RAILWAY CAR TRUCK BOLSTER

Filed March 7, 1967 4 Sheets-Sheet 1

INVENTOR
HANS B. WEBER
JOSEPH BROWN
BY
Henry Kozak
ATTORNEY

DAMPENED RAILWAY CAR TRUCK BOLSTER

Filed March 7, 1967 4 Sheets-Sheet 2

INVENTOR
HANS B. WEBER
JOSEPH BROWN
BY
Henry Kozak
ATTORNEY

Aug. 19, 1969 H. B. WEBER ET AL 3,461,814

DAMPENED RAILWAY CAR TRUCK BOLSTER

Filed March 7, 1967 4 Sheets-Sheet 3

INVENTOR
HANS B. WEBER
JOSEPH BROWN
BY
Henry Kozak
ATTORNEY

DAMPENED RAILWAY CAR TRUCK BOLSTER

Filed March 7, 1967 4 Sheets-Sheet 4

INVENTOR
HANS B. WEBER
JOSEPH BROWN
BY
Henry Kozak
ATTORNEY

United States Patent Office 3,461,814
Patented Aug. 19, 1969

3,461,814
DAMPENED RAILWAY CAR TRUCK BOLSTER

Hans B. Weber, Bedford, and Joseph Brown, Warrensville Heights, Ohio, assignors to Midland-Ross Corporation, Cleveland, Ohio, a corporation of Ohio Filed Mar. 7, 1967, Ser. No. 621,225
Int. Cl. B61f 3/00, 5/00
U.S. Cl. 105—193 6 Claims

ABSTRACT OF THE DISCLOSURE

A four-wheel, two-axle railway car truck of the non-integral side frame and bolster type having means interconnecting the side frames to prohibit swinging motion of the side frames transversely of the truck and stop means on the bolster for restricting the lateral movement of the bolster at a level below the plane containing the longitudinal axes of the axles.

BACKGROUND OF THE INVENTION

In the design of modern high capacity, high center of gravity freight car trucks of 70 tons or more, the control of excessive car roll or car rock is of immense importance since this factor, if not controlled, increases the possibility of derailment.

Excessive car roll is attributed to the following conditions: (1) geometry of the car, such as the location of its center of gravity relative to the track and the distance between truck centers, (2) a disturbance from the track as the car travels over uneven rail joints and, (3) travel of the car at its critical roll speed. Neither one of these conditions can be entirely eliminated to prevent car roll because: (1) car geometry is dictated by economical car construction and by criteria governing installation for loading and unloading the cars, (2) the maintenance of uneven rail joints is governed by the cost factor and, (3) the critical roll speed for high capacity, high center of gravity cars, which is between 15 and 20 miles per hour, is within the operating range attained during either the period of acceleration or deceleration of the car.

Excessive car roll leads to excessive unloading of the wheels on the side of the truck opposite to the direction in which the car body is rolling. This condition is especially critical during curve negotiation since car roll increases the tendency of the lead wheel on the outer side of the curve to climb the rail. Where superelevated curves are negotiated by a car at speeds that are below the equilibrium speeds of the curve, the unloading of the outer wheels is further aggravated by the car body leaning to the inside of the curve.

To prevent excessive unloading of the wheels, which could result in wheel lift, the roll amplitude of the car has to be held to a minimum. One method for minimizing car roll is to rely on increased damping of the bolster movements. This increased damping of the bolster must be of such a magnitude that for a given intensity of input disturbance applied to the car a finite and predetermined roll amplitude will result. This approach has the disadvantage that adequate control for car roll requires vertical and lateral damping characteristics that are excessive for proper control of the vertical and lateral oscillations of the car body insofar as cushioning lading against shock is concerned. The result is that the suspension system is overdamped for the vertical and lateral modes of oscillation, and causes a deterioration of the vertical and lateral ride. In the case of high capacity cars having adequate car roll control, the vertical and lateral ride could generally be overdamped by three to four times the required amount.

Another method of attempting to minimize the excessive roll amplitudes of the car would be to introduce a mechanical interference that would prohibit the large amplitudes. That is, by incorporating a mechanical interference between the bolster and side frame for restricting the lateral motion of the bolster caused by car roll, the car body may be prevented from moving laterally and leaning excessively.

Car trucks generally employ bolster gibs on the ends of the bolster for mating engagement with the adjacent column of the side frame. Although these bolster gibs are a mechanical interference, they are employed primarily to limit lateral motion of the bolster for the following reasons: (1) to prevent the accidental disassembly of the truck during operation, (2) to prevent the overstressing of the bolster load springs, and (3) to prevent the disengagement of the truck brake beam rigging, etc. These bolster gibs also inadvertently act as a mechanical interference for limiting excessive car roll. However, bolster gibs are not designed to be an effective means of preventing excessive car roll since in stopping the roll motion of the car they cause undue wheel unloading and possible wheel lift. By limiting the lateral motion of the car body through the use of bolster gibs, the lateral force of the rolling car body is transmitted by the bolster to the side frame at the height of the bolster ends above the rail. This lateral force against the side frame creates a moment which tends to rotate the truck about the top of one rail, thereby unloading and possibly lifting the wheels on the opposite side of the truck. This type of a design does not provide a satisfactory solution to the roll problem.

In reviewing the history of the design of 4-wheel freight car trucks, the pre-1900 basic truck generally incorporated a spring plank to interconnect the side frames. The purpose of the plank was to interlock the frames together to thereby form a substantially rigid truck. This type of construction minimized truck parallelogramming (the leading or lagging of one side frame relative to the other) and the tendency of the lead wheel to climb the rail during curve negotiation. Lateral motion of the bolster was obtained by the deflection of the bolster load support springs in the transverse direction. This lateral motion was limited by engagement of the usual bolster gibs with the opposing side frame columns. In this basic construction the bolster did not move in unison with the spring plank or side frame members. After the bolster had moved laterally and the gibs engaged the side frame, any further lateral force exerted upon the bolster by the car body was transmitted directly to the side frame, thereby restricting any additional lateral movement of the car body.

A further improvement in the design of car trucks led to the development of the swing-motion truck, for example, the truck disclosed in United States Patent No. 895,157. In this particular design the bolster and spring plank are interconnected by a center plate kingpin. Hence, both the bolster and plank moved in unison and all lateral motion was obtained through the tilting of the side frames. The tilting of the side frames was effected by the arcuate surface support of the frame in the area of the journal boxes and by the rocking between the plank and the seat upon which the end of the plank was disposed. Since the plank and bolster moved in unison, transverse deflecting of the springs was avoided. In this design, however, the only limitation to lateral motion was the resistance of the restoring forces afforded by the degree of tilt of the side frames. It is apparent that such an arrangement could lead to an excessive amount of lateral motion and therefore, unsafe car riding characteristics.

A further advance in the art led to the development of the car trunk disclosed in United States Patent No. 1,316,553 wherein lateral motion was obtained by providing rollers between the frame and spring plank. In this particular design, the plank and bolster moved in unison in the transverse direction. Bolster gibs and stop means on the plank served to limit the lateral motion to a predetermined amount. This construction attempted to soften the lateral reaction or restoring force since the restoring force did not depend upon the lateral deflecting characteristics of the bolster load support springs.

In the development of the more modern trucks, the spring plank was entirely eliminated. Hence, the bolster was supported on load springs that were disposed directly on the spring seat of the frame. Lateral motion of the bolster relative to the side frame was generally obtained by the lateral deflection of the load springs and, by a certain amount of tilting or swinging of the side frames. As in the prior art, lateral motion was limited by the engagement between the boltser gibs and the side frame columns. In the more modern freight car truck snubbing means is provided between the columns of the side frame and bolster for controlling both the vertical and lateral motion of the bolster. Thus, this more simplified truck construction resulted in the elimination of members, such as the spring plank, which were considered unnecessary in the development of control means to snub the bolster.

The development of the more modern truck led to a less rigid truck design which inherently permitted increased parallelogramming. To overcome this design deficiency, special gibs and stop lugs were incorporated on the bolster and side frames, respectively, in the newer type trucks in an attempt to restrict the amount of parallelogramming.

Also, a further attempt to obtain softer lateral response was made by reintroducing the spring plank that moved in unison with the bolster, after a slight predetermined amount of bolster movement, as disclosed in United States Patent No. 2,737,907. In addition to design refinements over the previously discussed older type trucks, a snubbing mechanism was introduced between the plank and bolster. The rocking action between the side frames and the plank was accomplished by supporting the plank on a knife edge seat on each frame so that the frames could function as pendulums. In addition, the design minimized truck parallelogramming. However, here again lateral motion was limited by the engagement of the bolster stops against the side frames.

It is therefore an important object of this invention to provide a railway car truck having embodied therein a positive means to check and control excessive roll amplitudes of an associated car body.

It is a further object to provide a car truck for high capacity, high center of gravity railway freight car use of the type in which an unsprung means interconnects the side frames to prevent the side frames from swinging transversely of the truck and in which the effect of the laterally directed forces applied to an unsprung member of the truck is reduced to provide safer operation of the car body.

Another object of this invention is to provide a mechanical interference between a bolster having unrestricted lateral movement relative to the side frames of a car truck and an unsprung means, to prevent excessive vertical unloading of the wheels.

SUMMARY OF THE INVENTION

The above and other objects of the invention are achieved in a railway car truck comprising a pair of side frames having a bolster extending therebetween, and an unsprung member wherein the side frames are rockably supported on the ends of the truck axles in such a manner that the frames may function as swing hangers and the unsprung means extends between and interconnects the frames to prevent the swing hanger type action of the frames, and the lateral forces of the bolster are applied to the side frames at a location disposed substantially below the level of both the side frame rocking connections and the bolster for maintaining a sufficient amount of vertical load on the wheels of the truck to avoid wheel lift.

In the preferred embodiment of the invention, the unsprung means comprises a spring plank having each end supported in nonsliding relationship on a wide seat on the side frame within the bolster receiving opening thereof.

DESCRIPTION OF THE DRAWINGS

In the drawings, with respect to which the invention is described below.

DESCRIPTION OF THE EMBODIMENTS

Figure 1:
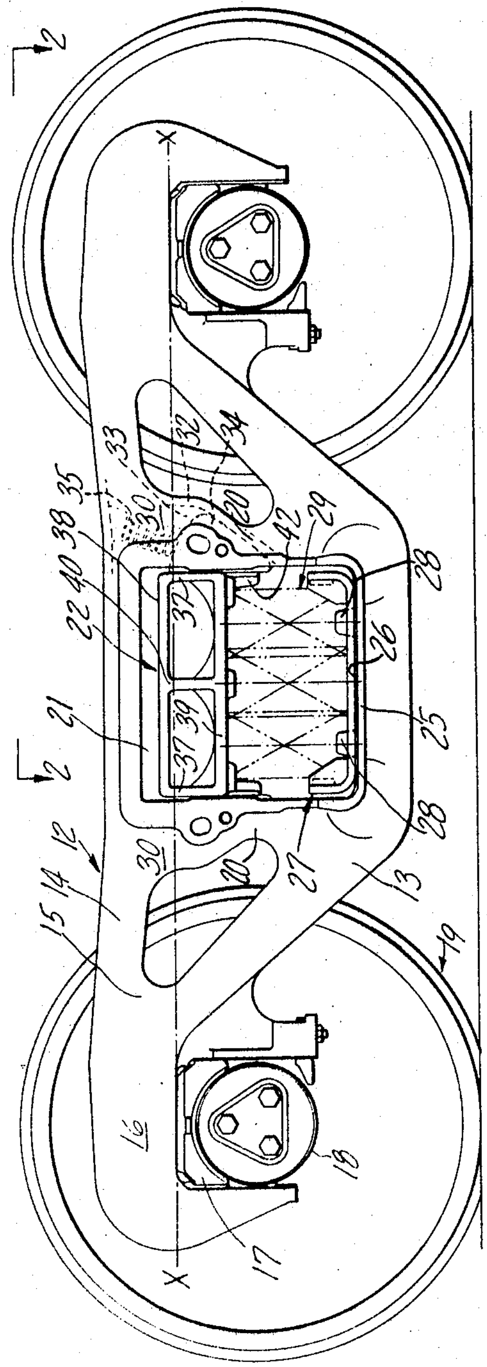
FIG. 1 is a side elevation of a railway car truck in accordance with the invention.
Figure 2:
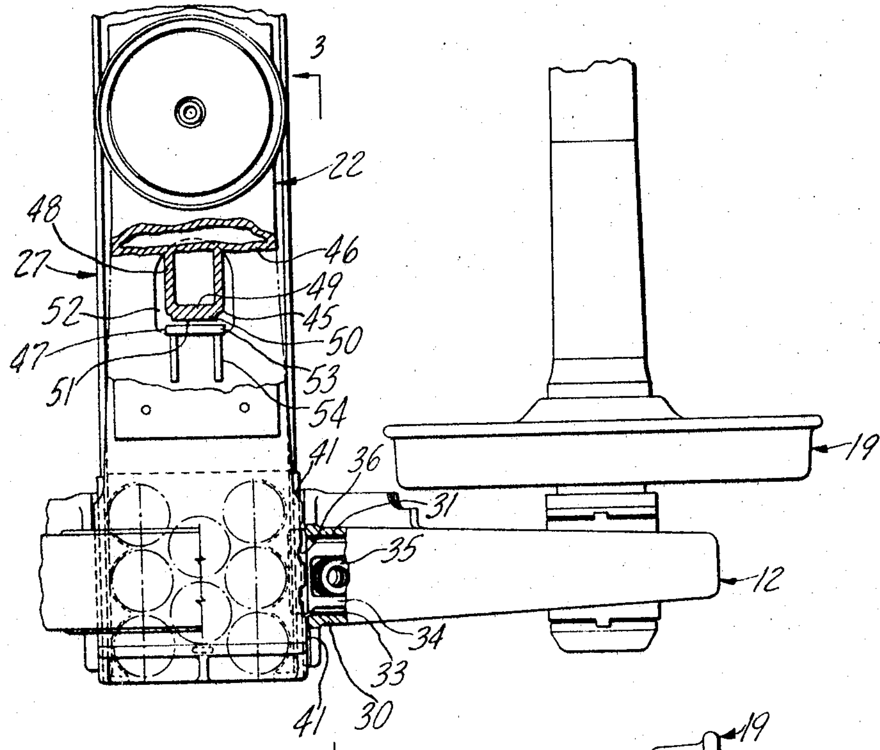
FIG. 2 is a fragmentary plan view, partially in section, taken along lines 2—2 of FIG. 1.
Figure 3:
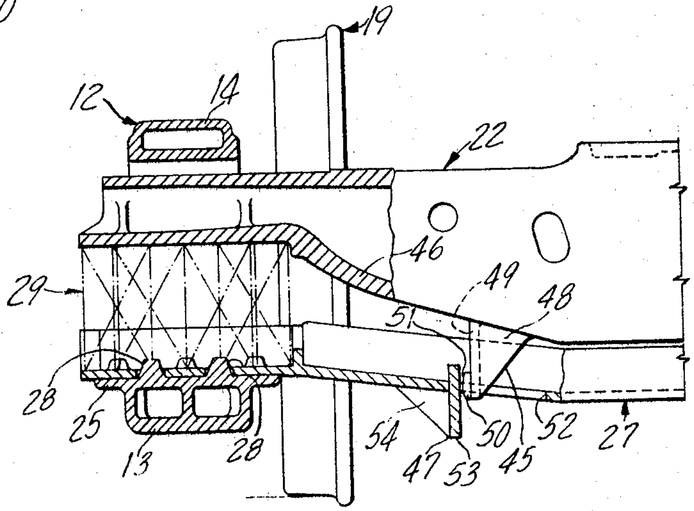
FIG. 3 is a fragmentary end view, partially in section, taken along lines 3—3 of FIG. 2.

Referring now to FIGS. 1 through 3 of the drawings, a partial view of a snubbed railway car truck is illustrated. The truck comprises a side frame 12 having a tension member 13 and a compression member 14. The members merge as at 15 and provide a pedestal jaw 16 for receiving an adapter 17 and bearing assembly 18 that receives a journal of a wheel and axle assembly 19. Intermediate the lengthwise direction of the frame 12, there is positioned a pair of spaced vertical columns 20. The columns connect the members 13 and 14 to form and partially define a bolster receiving opening 21. Opening 21 receives one end of a bolster 22 arranged with its longitudinal axis transverse to the length of the frame 12. It will be understood that while only one side frame has been shown in the drawings, there is a similar frame on the other side of the car truck, which cooperates with the bolster and other parts of the truck in like manner. The tension member 13 includes a widened central base portion 25 to provide a seat 26 for supporting the end of a spring plank 27. The plank is interlocked to the base 25 by upstanding bosses 28 to tie the two side frames together. A spring group 29 is disposed between the spring plank and bolster for resiliently supporting the end of the bolster.

Each column 20 comprises spaced vertical side walls 30, 31. The walls 30, 31 are structurally joined by a transverse wall 32 to define therebetween a pocket 33 that is in communication with the bolster receiving opening 21. Housed within each pocket is a friction unit for damping the vertical and lateral oscillations of the bolster 22 and the supporting springs or spring group 29. The fraction unit comprises a wedge 34 and a spring 35 and may be of the type disclosed in United States Patent No. 2,697,989. In operation, the spring 35 urges the wedge 34 downward into engagement with a vertical wear plate 36 at the side of the bolster 22, thereby providing frictional resistance to both vertical and lateral movements of the bolster.

The bolster illustrated in FIGURES 1 through 3 is generally of box-shape construction at each end comprising spaced vertical side walls 37, 37. Spaced top and bottom walls 38 and 39 structurally join side walls 37. A vertical central wall 40 joining the top and bottom walls reinforces the bolster ends. A pair of laterally spaced and vertically extending lugs 41, 41 project outwardly from the bolster side walls to form a recess therebetween. A depending extension 42 having an outwardly facing surface is provided on each side of the bolster with its vertical surface in coplanar relation with the outwardly facing surface of the side wall 37 and in opposed relation to each column 20. The aforementioned wear plate 36 is disposed within the recess in abutting relationship with the surfaces of the side wall 37 and extension 42. It is to be noted that lugs 41, 41 are in opposed relationship with the bolster-facing sides of columns 20, and that these lugs, not being in flanking relationship with the inboard or outboard sides of the columns, will not in any way restrict transverse movement of the bolster relative to the side frames.

However, relative transverse movement of the bolster with respect to the side frames is limited by a pair of horizontally spaced stop lugs 45 which are disposed along the longitudinal axis of the bolster. Each stop lug 45 depends from the bottom wall 46 of the bolster and is in spaced opposed relation with an abutment 47 carried by the spring plank 27 intermediate its ends. Each cooperating lug and abutment, 45 and 47, respectively, are spaced apart so as to provide a clearance therebetween that is at least equal to the normal clearance permitted between the conventional bolster gibs and side walls of the adjacent side frame column. This clearance is generally on the order of ⅜ of an inch and permits limited lateral movement of the bolster transversely of the truck. It will be seen that the engagement between each cooperating lug 45 and abutment 47 will occur at a level substantially below the horizontal plane X—X containing the rockable connection defined between the adapter 17 and pedestal jaw 16, which connection may be of the type disclosed in either United States Patent No. 2,717,558 or 2,737,907. This form of a connection normally allows the side frames of the truck to swing transversely of the truck.

Stop lug 45 comprises a U-shaped member 48 having a vertical, transversely extending wall 49 facing the adjacent end of the bolster 22. Disposed on the wall 49, at its lower end and also facing toward the bolster end, is a pad or boss 50 having a convex abutment surface 51. In the assembled position of the truck, spring plank 27 is provided with an opening 52 extending longitudinally thereof for receiving the lug 45. At the outer end of opening 52 is a vertical abutment portion 53 of abutment 47 in opposed relation to surface 51 of boss 50. As seen in the drawings, element 53 is reinforced by ribs 54, 54. Element 53 is of such vertical extent that in all vertical positions of the bolster it will be in opposed relation to boss 50 for engagement therewith upon lateral movement of bolster. Also, opening 52 is of sufficient size to accommodate lug 45 without interference during bolster movement.

Figure 5:
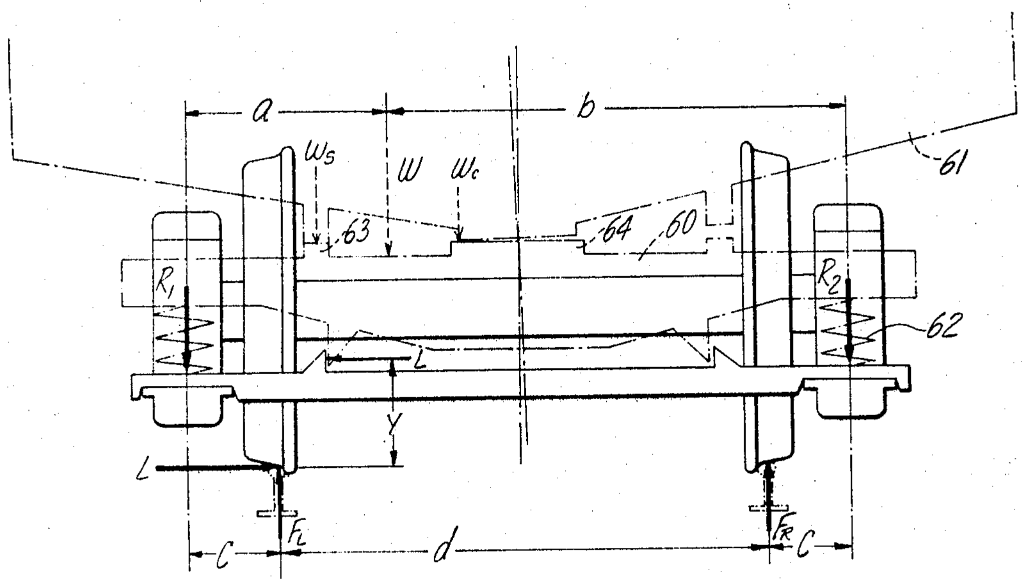
FIG. 5 is an end view of a schematic force diagram of a car truck in accordance with the invention.
Figure 4:
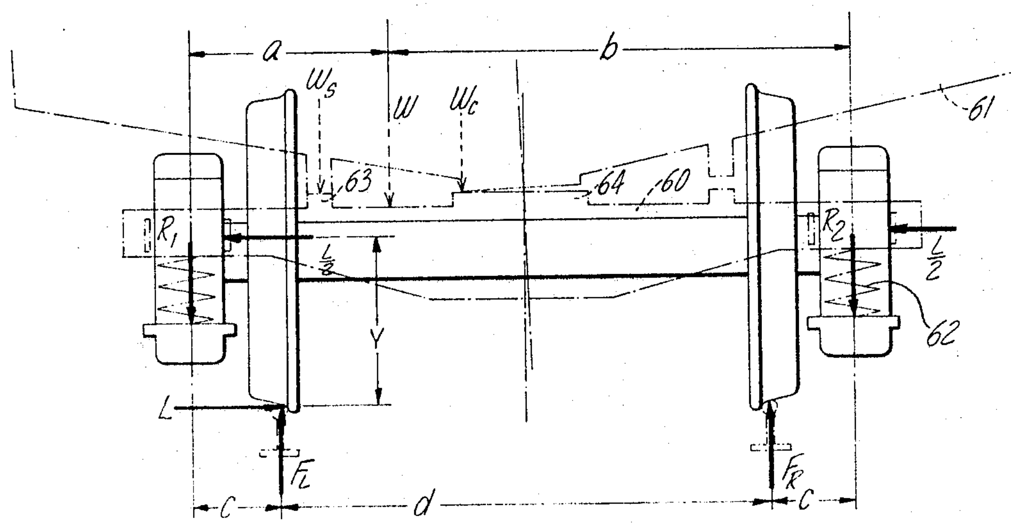
FIG. 4 is an end view of a schematic force diagram for a conventional standard freight car truck.

As mentioned hereinabove, by transmitting the lateral forces from the bolster to the side frame at a much lower level than has heretobefore been provided, and by substantially prohibiting the side frames from functioning as swing hangers, improved car roll performance and reduction in wheel lift tendencies are obtained. FIGURES 4 and 5 represent schematic force diagrams for the conventional car truck and for the improved car truck disclosed herein when both types of trucks are subjected to a lateral force due to car roll. As illustrated in the drawings, the bolster 60 in each case is represented as a part of the sprung mass and, as such, acts laterally as an integral part of the car body 61. The wheel-axle-side frame assembly is considered to act basically as a single unsprung body. In this analysis the load springs 62 are considered as having their upper half as part of the sprung mass and their lower half as part of the unsprung mass. In FIGURES 4 and 5, W is the weight of the sprung mass (which is one-half the car weight and is the resultant of loads $W_S$ and $W_C$ acting on the side bearings 63 and center plate structure 64), L is the lateral force imposed upon the system by operating conditions under the influences of car roll, etc., $F_L$ and $F_R$ are the left and right vertical wheel force, respectively, and $a$, $b$, $c$, $d$ and $y$ are various dimensions of the truck. It is assumed that during car roll the car weight W can be applied at any point between the center line of the car body at the bolster center plate 64 and the side bearing 63. Due to the off-center load W, the respective loads on the left and right side frames are obtained by taking the summation of moments. Accordingly, when the truck systems shown in FIGURES 4 and 5 are in a state of equilibrium, the wheel force $$F_R = \frac{\dfrac{W[a(c+d)-bc]}{a+b} - Ly}{d}$$

From this equation it can be seen that for a given lateral force L, a decrease in $y$ causes an increase in wheel force $F_R$. In other words, a decrease in the height at which the lateral force is applied from the rails causes a larger wheel force on the unloaded side of the truck. This larger wheel force provides greater safety against derailment.

Figure 7:
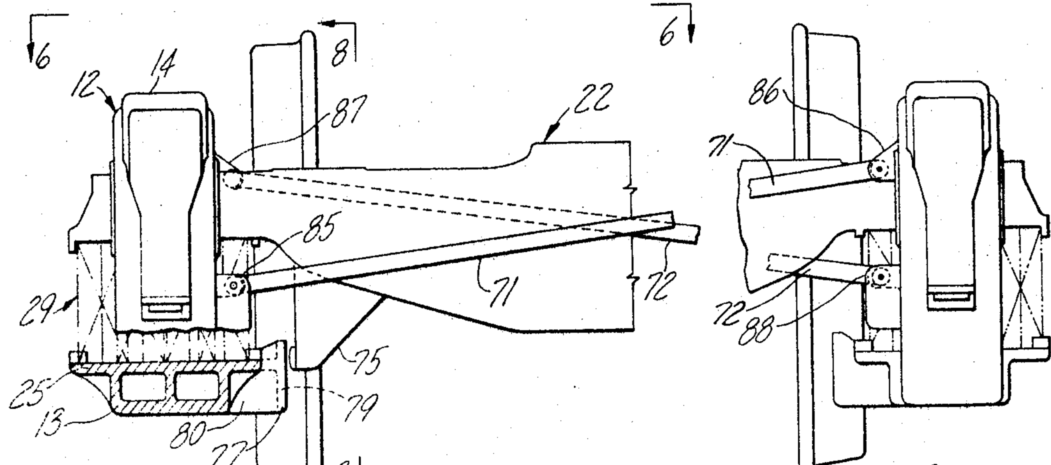
FIG. 7 is a fragmentary end view taken along lines 7—7 of FIG. 6.
Figure 8:
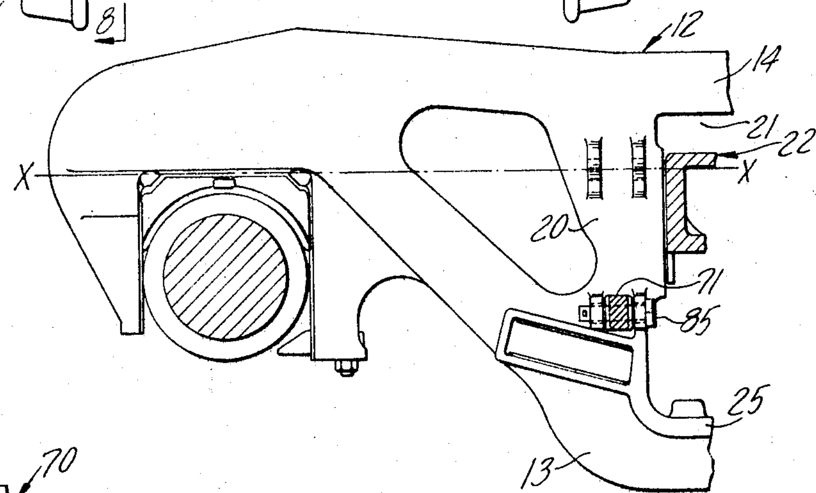
FIG. 8 is a fragmentary side elevation of the car truck, taken along lines 8—8 of FIG. 7.
Figure 6:
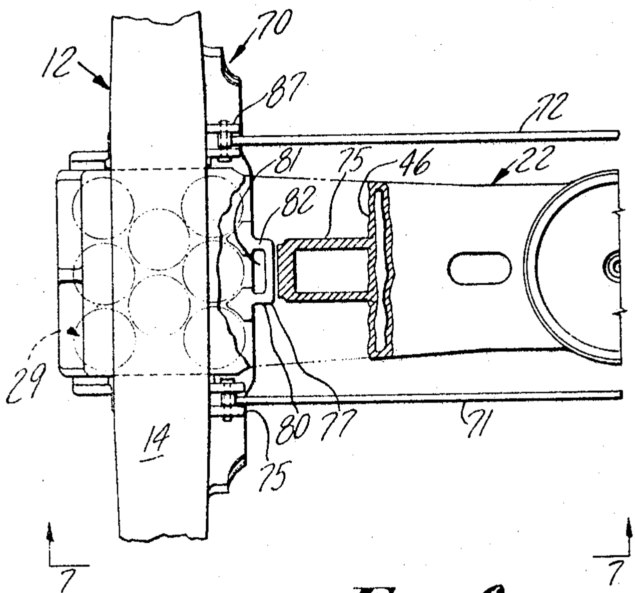
FIG. 6 is a fragmentary plan view of another embodiment of the invention, partially in section, taken along lines 6—6 of FIG. 7.

Another mode of achieving the end result of the invention is shown in the modification of a car truck 70 illustrated in FIGURES 6 through 8 wherein parts corresponding to those of FIGURES 1 through 3 are identified by identical numerals. The present embodiment differs from the preferred one in that a pair of tie bars 71 and 72 are used instead of the spring plank 27 for interconnecting the side frames 12, 12.

Each side frame 12 of the truck 70 includes the tension and compression members 13 and 14 and the pair of spaced vertical columns 20, 20. The columns interconnect members 13 and 14 to define the bolster opening 21 therewith for receiving the end of the bolster 22. The spring group 29 seated on the wide base 25 of the frame supports the end of the bolster.

Movement of the bolster laterally of the truck in either direction is limited by a stop means 75 which depends from the bottom wall 46 of the bolster in a manner similar to lug 45 as previously described. Stop means 75 is adapted to engage an abutment 77 on the inboard side of the widened central base portion 25 of tension member 13. Abutment 77 comprises a bolster lug engaging portion 79 joined by supporting webs 80, 81 and 82 to the base 25.

To prevent the side frames 12, 12 from swinging transversely of the truck, the tie bars 71 and 72 are disposed in a crossed relationship to each other as viewed in FIGS. 6 and 7, each bar being pivotably connected at its ends to the adjacent side frame. Thus bar 71 is connected to the side frame on the left side of FIG. 7 at a point below the bolster end, as at 85, while the other end of bar 71 is connected to the upper end of the other side frame, as at 86. Bar 72, which is disposed on the opposite side of the bolster from bar 71, is connected to the upper end of the side frame on the left, as at 87, while its other end is connected to the lower side of the other side frame, as at 88. Each connection is a bolt and lug arrangement which permits limited angular movement of the bar relative to the side frame. It is to be noted that the pivotal connection 86 and 87 of each bar is disposed substantially in the horizontal plane X—X containing the rockable adaptor-side frame connection at each end of the frame and each connection 85 and 88, is disposed in a plane below the longitudinal axis of the axles. Since plane X—X contains the longitudinal pivotable axis of the frame, angular movement of the connections 86 and 87 about the pivotable axis is minimized. Thus the tie bars 71 and 72 act as a deterrent to the swinging movement of each frame as each frame attempts to swing in the manner of a pendulum about its longitudinal axis contained in the X—X plane and in response to the lateral force transferred to it through the abutment means 77. This is accomplished by transferring the lateral load that is applied to each side frame to the other side frame through the tie bar connection disposed at the level below the plane containing the axes of the axles.

Thus what has been described hereinabove is a railway car truck of simple and economical construction which has provisions for controlling excessive car roll and for reducing the wheel lift tendency of the modern freight car truck by stopping the lateral motion of the bolster at a substantially lower level in comparison with a standard truck having bolster gibs for lateral stops.

The terms and expressions which have been employed are used as terms of description and not of limitation, and there is no intention of excluding such equivalents of the invention described or of the portions thereof as fall within the claims.

What is claimed is:

1. In a railway car truck comprising a pair of side frames journaled on associated wheel and axle assemblies for swinging movement transversely of the truck under the action of laterally directed forces applied to the truck, each frame having a bolster receiving opening, a bolster extending between said frames, each end of said bolster being received in said opening of th adjacent frame for unrestricted movement of the bolster transversely of said frames, and spring means within each opening for supporting an end of said bolster, the improvement comprising unsprung means extending between said frames in interlocking relationship therewith for substantially restricting the transverse swinging movement of the side frames, and stop means on said bolster adapted to transmit lateral forces from said bolster to at least one of said frames at a point below the plane containing the axes of the axles upon a limited predetermined amount of lateral movement of said bolster toward one of said frames, said stop means preventing further movement of the bolster transversely of said frames.

2. The car truck of claim 1 in which said stop means transmits said bolster forces to said frame through engagement with said unsprung means, and wherein said unsprung means comprises a spring plank member having an abutment in spaced opposed relation to said stop means.

3. The car truck of claim 1 in which said stop means comprises a lug depending from said bolster, and said unsprung means has an abutment in predetermined spaced opposed relations to said lug.

4. The car truck of claim 1 in which the engagement between said bolster and said unsprung means occurs at a level in line with the lower end of said frames.

5. The car truck of claim 1 in which said unsprung means comprises a pair of tie bars extending between said frames and being pivotally connected thereto, said tie bars being disposed on opposite sides of said bolster and in crossed horizontal spaced relationship to each other, and said stop means engages one of said frames to transmit said lateral forces from said bolster to said frame.

6. The car truck of claim 1 in which each side frame comprises a compression member and a tension member joined by a pair of spaced vertical columns defining therebetween said bolster receiving opening, and each column having a pair of laterally spaced side walls and rear wall between the side walls defining a pocket in communication with said bolster opening for receiving a friction wedge; a retractable wedge in each pocket resiliently biased toward the bolster; and resilient means urging said wedge into engagement with the bolster for damping vertical and lateral movements of the bolster relative to the side frames.

References Cited

UNITED STATES PATENTS

| | | | |
|---|---|---|---|
| 304,372 | 9/1884 | Stimson | 105—208 |
| 2,052,639 | 9/1936 | Martin | 105—208 XR |
| 2,347,628 | 4/1944 | Cottrell | 105—208.2 |
| 2,625,117 | 1/1953 | Van Der Sluys | 105—208 |
| 2,928,358 | 3/1960 | Meyer | 105—197 XR |

ARTHUR L. LA POINT, Primary Examiner

HOWARD BELTRAN, Assistant Examiner

U.S. Cl. X.R.

105—197, 208, 208.2